United States Patent
Sobkin et al.

(10) Patent No.: US 6,555,600 B2
(45) Date of Patent: Apr. 29, 2003

(54) CORROSION INHIBITING THERMOPLASTIC ALLOYS

(75) Inventors: Alex Sobkin, Woodbury, MN (US); Boris A. Miksic, North Oaks, MN (US); Michael Hobday, Lino Lakes, MN (US)

(73) Assignee: Cortec Corporation, St. Paul, MN (US)

( * ) Notice: Subject to any disclaimer, the term of this patent is extended or adjusted under 35 U.S.C. 154(b) by 126 days.

(21) Appl. No.: 09/777,487

(22) Filed: Feb. 5, 2001

(65) Prior Publication Data

US 2001/0016615 A1 Aug. 23, 2001

(51) Int. Cl.⁷ .......................... C08J 3/22; C08K 5/3492; C08K 5/098; C08K 3/28; C08K 5/19
(52) U.S. Cl. .......................... 523/351; 524/91; 524/240; 524/397; 524/428; 252/387; 252/388; 252/389.1; 252/389.62; 252/390; 252/392; 252/394
(58) Field of Search .......................... 523/351; 252/387, 252/388, 389.1, 389.62, 390, 392, 394; 524/91, 240, 397, 428

(56) References Cited

U.S. PATENT DOCUMENTS

| | | | | |
|---|---|---|---|---|
| 5,422,187 A | * | 6/1995 | Miksic et al. | 252/390 |
| 6,054,512 A | | 4/2000 | Nelson et al. | 524/91 |
| 6,113,980 A | * | 9/2000 | Laver | 524/91 |

* cited by examiner

*Primary Examiner*—Peter Szekely
(74) *Attorney, Agent, or Firm*—Haugen Law Firm PLLP

(57) ABSTRACT

Corrosion inhibiting thermoplastic alloys and methods of preparing same for use in fabricating molded articles with long-term corrosion protection. Masterbatches of nylon, polycarbonate, and polyethylene terephthalate high temperature engineering plastic resins together with selected corrosion inhibitor formulations are extruded for use in injection molding operations Molded articles are prepared from the high temperature engineering plastic resins and a solid phase corrosion inhibitor blended in situ, and wherein the resin consists essentially of nylon, polycarbonates, and polyethylene terephthalate, and wherein the corrosion inhibitor contains a blend of corrosion inhibitors such as cyclohexylammonium benzoate, sodium nitrite, benzotriazole, and sodium sebacate.

3 Claims, No Drawings

CORROSION INHIBITING THERMOPLASTIC ALLOYS

CROSS-REFERENCE TO RELATED PATENT

The present application is an improvement over the invention disclosed in our U.S. application Ser. No. 09/229,055, filed Jan. 12, 1999, of Thomas Nelson, et al., entitled "CORROSION INHIBITING THERMOPLASTIC ALLOYS", now U.S. Pat. No. 6,054,512, issued Apr. 25, 2000, and assigned to the same assignee as the present invention.

BACKGROUND OF THE INVENTION

Novel corrosion inhibiting thermoplastic alloys can be prepared by blending corrosion inhibitors with selected engineering plastics having high hardness and which are suitable for injection molding. In accordance with the present invention, higher melting durable blends of a resinous engineering plastic and a selected corrosion inhibitor are produced in order to form improved molded objects or moldings useful for long term protection of metallic objects and/or electronic media devices against corrosion, including, for example, multi-faced enclosures fabricated from top, bottom and side panels, with the panels being fabricated in accordance with the present invention. Such multi-faced enclosures are known in the art. Higher melting polymers characterized as engineering plastics such as nylon, polyesters (PET) or polycarbonates such as Lexan can be blended with selected corrosion inhibitors to create working formulations which are adaptable for direct application in high temperature operations such as injection molding. For example, the selected corrosion inhibitors are retained in-situ with minimal loss during the molding operation or cycle and yet will subsequently slowly vaporize and/or sublime around the devices being retained within the enclosure to provide corrosion protection for long term use and/or storage.

Flexible films incorporating vapor corrosion inhibitor chemicals have been available and are used widely for the protection of metallic articles in storage and shipping. Such applications are especially useful for sensitive electronic media devices and other delicate metallic articles. Paper has also been coated with vapor corrosion inhibitors and is used extensively for protection of metallic articles during storage and shipping. Vapor phase corrosion chemicals are also available in small pellets and packages, and may also be impregnated into plastic foam to provide other methods of protection. All of the above methods are typically temporary in nature, in contrast to the products of the present invention which can provide years of protection particularly in enclosed or confined areas.

The most effective inhibitors volatilize easily and this volatility feature has been found in the past to preclude their use in the higher melting thermoplastic systems. Selected improved corrosion inhibiting formulations, in combination with high temperature engineering plastics including nylon, polyesters and/or polycarbonates provide a unique feature when treated in accordance with the present invention, inasmuch as the corrosion inhibitors become semi-permanently encapsulated or partially solubilized within the resin matrix, and thereafter leach out at a slow rate which provides ongoing protection over an extended period of time.

SUMMARY OF THE INVENTION

In accordance with the present invention, it has been determined that the selected higher melting engineering plastic resins can be blended with selected higher melting corrosion inhibiting chemicals in a masterbatch formulation containing about 85 parts resin and 15 parts inhibitors. This masterbatch can be blended further with the resin to produce a working formulation or mix containing about 1–7.5% inhibitors, balance resin, and with this formulation being suitable for injection molding.

Typical articles prepared with from 1 to 7.5% inhibitor in a the resin mix are knife holders, components for electronic devices and/or articles, enclosures for delicate electronic systems, and other injection molded pieces utilized in enclosing and protecting metallic articles against corrosion from corrosive elements in t atmosphere and/or ambient. These enclosures for delicate electronic systems, for example, typically comprise multi-faced enclosures fabricated from top, bottom and side panels which are, in turn, prepared pursuant to the features of the present invention.

Therefore, it is a primary object of the present invention to provide an improved molding compound capable of receiving and retaining a vapor phase corrosion inhibitor, with the compound thereafter being subjected to an injection molding operation to form an article to ultimately release a corrosion inhibitor in vapor phase from within the body or structure of a molded article and forming a protective environment. Because of the requirements of high temperature engineering plastics of the present invention, nylon, polesters and polycarbonates have been found to be most uniquely and advantageously utilized inasmuch as they are compatible with and may be readily filled with a quantity of selected granular, pulverulent or powder form corrosion inhibitor. The melting point of the base resin is such that the selected corrosion inhibitors remain soluble, are not released, and do not become fugitive during exposure to conditions required in the injection molding operation. Such a combination of properties is important inasmuch as exposure to relatively high temperatures for finite periods of time such as during a molding operation, is normally adequate to cause certain corrosion inhibiting compounds, when combined with other resins, to flash, sublime or otherwise become lost during the molding process. By use of carefully selected corrosion inhibitors and high temperature engineering plastics together with appropriate blending and masterbatch techniques, a suitable molding material may be made from these resins with the selected corrosion inhibiting compounds being retained in the plastic matrix throughout the process.

It is a further object of the present invention to employ a technique such as a masterbatch preparation which has been found to preserve the quality and character of the corrosion inhibitor in the resin matrix for a period of time suitable for achieving an appropriate shelf life, during which the pre-blended masterbatch is extended with additional quantities of resins in preparation of the working formulation or blend suitable for the injection process.

Other and further objects of the present invention will become apparent to those skilled in the art upon a study of the following specification and appended claims.

DESCRIPTION OF THE PREFERRED EMBODIMENT

Masterbatches embodying features of the present invention are prepared using engineering plastics or resins found suited for injection molding applications, all in accordance with the present invention. These masterbatches are preferably blended with selected corrosion inhibitors at a ratio of 85 parts resin and 15 parts inhibitor or in some cases and with certain equipment, may be used as is, without blending. The select inhibitors suitable for this process are higher melting types including sodium nitrite, cyclohexylammonium-benzoate, benzotriazole, and sodium sebacate. Formulations of selected inhibitors that have been found suited for blending with these higher melting engineering resins and which are particularly effective contain the following components:

| FORMULA 1 | |
|---|---|
| Cyclohexylammonium benzoate | 6% |
| Sodium nitrite | 25% |
| Sodium sebacate | 65% |
| Benzotriazole | 4%. |

Another formulation found to be especially compatible with these resins is as follows:

| FORMULA 2 | |
|---|---|
| Cyclohexylammonium benzoate | 8% |
| Sodium nitrite | 27% |
| Sodium sebacate | 65%. |

In the event the metallic articles to be protected do not include copper, Formula 2 set forth above is an effective inhibitor combination.

General Comments

Those Nylon 6 resins produced by Monsanto, such as those sold under the trade designations "Vydyne M-344-01" have been found to function effectively when used as the carrier resin in the masterbatch and also function well as the further extender for the masterbatch when mixed to produce the working blend needed for injection molding operation. In addition to Nylon 6, other polyamide polymers properly characterized as nylons may also be employed, such as, for example, Nylons 9, 11, and 12. Furthermore, those certain nylons obtained as the result of a condensation product of an acid such as adipic acid, and a diamine such as hexylmethylenediamine may be employed. These condensation products include, by example, Nylon 66 as well as others such as Nylon 88 and Nylon 610. Each of these nylons is properly characterized as an engineering plastic.

Typical specific examples describing the invention are as follows:

EXAMPLE 1

Vydyne M-344-01, 85 parts, and 15 parts of an inhibitor mix (Formula 1) was fed into a vented twin screw extruder. Temperatures ranged from 230° C. to 240° C. and the extrudate was water or air cooled and pelletized. The pellets can be further blended at a ratio of 12 parts pellets to 88 parts Vydyne M-344-01 to produce a blend suitable for injection molding. Injection molding produced rigid pieces that tested satisfactorily as a carrier of in-situ retained corrosion resistant chemicals (contact inhibitor) and also as a long-term vapor phase corrosion inhibitor source. The physical properties of the molded articles were such that subsequent release of the inhibitor into the ambient through sublimation and/or contact phenomena was appropriately achieved.

EXAMPLE 2

Vydyne M-344-01, 85 parts, and 15 parts of an inhibitor mix (Formula 2) was fed into a vented twin screw extruder. The temperature ranged from 230° C. at the first zone to 240° C. at the die. The strands were water quenched and pelletized. These masterbatch pellets were further blended with the nylon resin at a ratio of 12 parts to 88 parts Vydyne M-344-01 to produce a working blend suitable for injection molding. Molded articles prepared with Formula 2 were especially useful for an embedded steel application such as for use as a knife handle.

Volatility of the corrosion inhibitor in the working formulation or mix is especially important when the material is subjected to the final injection or forming stage of preparing rigid forms. If the pieces have a thick cross-section or require higher molding temperatures, degassing of the inhibitor could ensue and adversely affect the properties of the molded piece. The inhibitor formulations described in Formulas 1 and 2 are well suited for a wide range of higher melting resins and can be used without undergoing degassing or significant loss during molding.

Inhibitors that are somewhat more volatile are those containing somewhat larger proportions of cyclohexylammonium benzoate, ammonium benzoate and other salts of amines. Components of Formula 1 or 2 can be used if the article being molded is of a configuration such that molding can be achieved without degassing. Formulas 1 and 2 were both effective in corrosion control when tested in standard tests. In each case, controls of the same resins without inhibitors were prepared and compared to the resins that included Formula 1 and Formula 2 inhibitors.

Nylon parts prepared with Formula 1 protected both steel and copper parts when exposed to a corrosive environment while the control without inhibitors did not protect either the steel or copper.

A nylon part prepared with Formula 2 protected steel when exposed to a corrosive environment while the control without inhibitors did not.

In another example, electrical connectors were injection molded with a 15% loading of the nylon masterbatch and after assembly, tested in a corrosive environment as follows:

Three connectors prepared with inhibitors injected molded with nylon and one control (no inhibitor) were suspended over a $Na_2SO_4$ and $NH_4Cl$ solution that was cycled for eight hours at 80° C. and 16 hours at room temperature for 30 days.

The control developed severe red rust on the bolts' surface while the three protected connectors were rust free.

EXAMPLE 3

Lexan 940A, a polycarbonate characterized as a high temperature engineering plastic was blended with the components of Formula 2 in the same procedure as the nylon example except the process temperatures for extruding and molding were about 300° C.

EXAMPLE 4

Polyethylene terephthalate, a polyester designated "PET" was extruded with Formula 1 chemicals to produce a masterbatch that was blended with more PET. The resulting resin with about 2% Formula 1 was injection molded to produce containers suitable for long term protection of metallic articles, with these such containers comprising multi-faced enclosures with top, bottom and side panels.

It will be appreciated that the specific examples provided herein are for purposes of illustration only and are not to be otherwise construed as a limitation upon which the invention would otherwise be entitled.

What is claimed is:

1. The method of preparing a moldable formulation comprising the steps of:
   (a) preparing a masterbatch comprising:
      (i) 100 parts of a high temperature engineering plastic resin consisting of nylon 6; and
      (ii) between about 5 parts to 20 parts of a vapor phase corrosion inhibitor selected from the group consisting of cyclohexylammonium benzoate, sodium nitrite, benzotriazole, sodium sebacate, and mixtures thereof; and
   (b) extending the masterbatch with said engineering plastic resin to produce a working blend containing at least about 95% said high temperature engineering plastic resin, balance corrosion inhibitor.

2. A multi-faced enclosure fabricated from top, bottom and side panels, and wherein the panels are prepared from a moldable formulation comprising the steps of:
   (a) preparing a masterbatch comprising:
      (i) 100 parts of a high temperature engineering plastic consisting of polycarbonate, and
      (ii) between about 5 parts to 20 parts of a vapor phase corrosion inhibitor selected from the group consisting of cyclohexylammonium benzoate, sodium nitrite, benzotriazole, sodium sebacate, and mixtures thereof; and
   (b) extending the masterbatch with said engineering plastic resin to produce a working blend comprising at least about 95% said engineering plastic resin, balance corrosion inhibitor.

3. A multi-faced enclosure fabricated from top, bottom and side panels, and wherein the panels are prepared from a moldable formulation comprising the steps of:
   (a) preparing a masterbatch comprising:
      (i) 100 parts of a high temperature engineering plastic resin selected from the group consisting of nylon, polycarbonate, and polyethylene terephthalate, and
      (ii) between about 5 parts to 20 parts of a vapor phase corrosion inhibitor selected from the group consisting of cyclohexylammonium benzoate, sodium nitrite, benzotriazole, sodium sebacate, and mixtures thereof; and
   (b) extending the masterbatch with said engineering plastic resin to produce a working blend comprising from between about 1% to about 7.5% corrosion inhibitor, balance high temperature engineering plastic resin.

* * * * *